US012245573B1

United States Patent
Chatter

(10) Patent No.: US 12,245,573 B1
(45) Date of Patent: Mar. 11, 2025

(54) DEVICE AND METHOD TO REMOVE HIVES OF BEES AND OTHER POLLINATORS WITHOUT KILLING THEM

(71) Applicant: Sunshine Partners LLC, Concord, MA (US)

(72) Inventor: Saejal Chatter, Concord, MA (US)

( * ) Notice: Subject to any disclaimer, the term of this patent is extended or adjusted under 35 U.S.C. 154(b) by 19 days.

(21) Appl. No.: 18/496,295

(22) Filed: Oct. 27, 2023

Related U.S. Application Data

(63) Continuation-in-part of application No. 17/503,448, filed on Oct. 18, 2021, now abandoned.

(60) Provisional application No. 63/092,699, filed on Oct. 16, 2020.

(51) Int. Cl.
*A01K 57/00* (2006.01)

(52) U.S. Cl.
CPC .................... *A01K 57/00* (2013.01)

(58) Field of Classification Search
CPC ........ A01K 57/00; A01K 51/00; A01K 55/00; A01M 3/00; A01M 13/00; A01M 17/00; A01M 19/00; A01M 21/00; A01M 21/04
USPC ............................................................ 449/3
See application file for complete search history.

(56) References Cited

U.S. PATENT DOCUMENTS

| | | | |
|---|---|---|---|
| 3,656,254 A | | 4/1972 | Schmedes et al. |
| 5,768,907 A | * | 6/1998 | Lee .......... A01M 1/24 43/132.1 |
| 6,205,702 B1 | | 3/2001 | Ammons |
| 7,076,916 B2 | | 7/2006 | Bianchini |
| 10,721,919 B2 | * | 7/2020 | Wilson-Rich .......... G08B 23/00 |
| 10,757,921 B1 | * | 9/2020 | Wood ..................... A01K 51/00 |
| 2006/0064924 A1 | | 3/2006 | Lee |

FOREIGN PATENT DOCUMENTS

| | | |
|---|---|---|
| FR | 2304287 A1 | 10/1976 |
| JP | 2012060926 A | 3/2012 |
| KR | 20110088193 A | 8/2011 |

\* cited by examiner

*Primary Examiner* — Tye William Abell
*Assistant Examiner* — Maria E Graber
(74) *Attorney, Agent, or Firm* — Clocktower Law; Erik J. Heels; Michael A. Bartley

(57) ABSTRACT

A device is described for cooling air and directing it onto a hive. As the hive cools, pollinators within have reduced mobility and are not able to move aggressively to attack the remover. A temperature sensor within the device allows the remover to identify when air is sufficiently cooled to reduce pollinator activity without being lethal. As the cold air is blowing, the remover uses attached sharp edges to cut down the hive. As the hive falls on the ground away from the blower where the temperature is warmer, pollinators regain their muscle movement, and can soon resume their normal activities. However, by then the remover is gone and is not attacked.

1 Claim, 12 Drawing Sheets

730

DEVICE AND METHOD TO REMOVE HIVES OF BEES AND OTHER POLLINATORS WITHOUT KILLING THEM

CROSS-REFERENCE TO RELATED APPLICATIONS

This utility patent application is a continuation-in-part of U.S. patent application Ser. No. 17/503,448, filed Oct. 18, 2021, titled "Device to Remove Hives of Bees and Other Pollinators Without Killing Them", naming inventor Saejel Chatter, which claims priority from U.S. provisional patent application Ser. No. 63/092,699, filed Oct. 16, 2020, titled "Device to Remove Hives of Bees and Other Pollinators Without Killing Them", naming inventor Saejal Chatter.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2023, Sunshine Partners LLC.

BACKGROUND

Field of Technology

This relates to tools to remove hives without killing insects within.

Background

Honeybees are dying in large quantities since being decimated by colony collapse disorder in the mid 2000s. Wasps and hornets face a similar fate. These insects are key part of farming, and their shortages cause damage to crop pollination and growth. The problem has seriously intensified over the past decade and is now considered an environmental crisis by many. If the trend continues, it will seriously threaten our lives as we know it—as our survival depends on the food. (see NPR story, Apr. 29, 2019, "Bees are in trouble, here is how you can help" by Barbara Moran at www.wbur.org/earthwhile/2019/04/29/the-pollinators-documentary)

Scientists at University College London stated that wasp numbers are in decline as well, with a reduction in numbers of 50% in 20 years. Like bees, wasps are also key to pollination. See metro.co.uk/2018/09/19/wasps-are-just-as-endangered-as-bees-and-you-should-stop-stamping-on-them-ok-7958714/.

A first pollinator, bees, are a primary means through which cross pollination occurs among plants. As pollination is reduced, so is the volume of produce generated by the crop.

Another pollinator, wasps, not only help with pollination. but unlike bees, wasps are also carnivorous. They work both as excellent plant pollinators, and also eat pests-giving plants a decent chance at flourishing and positively impacting crop yield. In effect, they are a natural pesticide that helps crops produce with fewer toxic pesticides/herbicides that pollute the food supply, air, water, and earth.

Hornets, a type of wasp, serve an essential function to fruiting and flowering plants. Although they do not produce honey like bees, they also support pollination as they travel from plant to plant or flower to flower. Without hornets, pollination will not happen at the same rate, thus slowing the already stunting growing cycle and adversely impacting the food chain. An additional benefit of hornets is that they mostly feed on other insects and small bugs. They support pest population control without which insects like spiders, caterpillars, flies, crane flies and beetles would breed at out of control rates and become a greater nuisance.

In this document sometimes such bugs including bees, wasps, hornets, and yellow jackets are collectively referred to as "pollinators." These insects are key to agriculture, and thus friends of both farmers and broader humanity.

There are several reasons behind the large drop in their population. The primary suspects are:
- The rampant usage of pesticides, chemicals that indiscriminately kill good and bad crop damaging insects. Once sprayed, these chemicals stay in the air for a while, and eventually get into the ground and the water supply. Needless to say, such chemicals are damaging to general human health and particularly harmful to those in close proximity to crops.
- Herbicides are widely sprayed to minimize weeds and other undesirable plants. Pollinators are unable to detect whether a plant is covered in a poisonous herbicide and will carry the chemicals to other crops and in some cases soon die from exposure.
- Chemicals that are routinely sprayed over lawns to keep them insect free are also suspect in the deaths of these critical Pollinators.
- An increase in suburban development and human population. Typically closer to wooded areas and feature backyards with trees, flowers, and vegetables, these neighborhoods are pollinators natural habitat. Hives often form on the outside walls of buildings, houses, and residential areas. For humans, there is a risk of getting stung by certain types of bees, but more commonly by Wasps and Hornets who often chase the intruder for quite a distance. Bees attack when provoked, but wasps and hornets are naturally aggressive predators; hence, the desire and the need to remove their hives. The most common removal method is to spray insecticides that either kill them instantaneously on contact or quickly injure them thereby disabling their ability to attack the person trying to remove them. In these cases, within a few minutes to a few hours the bees die. The same applies to other insects such as Hornets and Wasps. Two side effects of this vastly used approach to kill bees is that their honeycomb is contaminated with chemicals and rendered useless and the individual removing them is exposed to poisonous chemicals. Additionally, some pollinators survive this conventional approach, but become carriers of the toxic chemicals sprayed on them and subsequently spread the toxicity to the flowers they are pollinating. These toxic chemicals leech into the water, ground, and air contributing to other environmental concerns in addition to putting inhabitants at risk from exposure.
- Although a less common approach to get rid of hives, lighting fires and smoking out the pollinators is still a removal practice. This creates a fire hazard close to the building structures and is not encouraged. Even when used in a backyard away from a building there is a risk in inducing a fire, especially in the dry season. The process is time intensive and typically takes several hours.
- Another less common tactic is to spray vinegar water mixture on the hive. This requires repeated sprayings over few days. The sprayer runs a high risk of getting stung, and it can also damage the paint on that area of the building.

Climate change is also suspected in playing a role in the quicker pace of pollinator deaths.

These nest forming pollinators such as bees, wasps, hornets, yellow jackets etc. are typically active in spring and summer. They lack ability to maintain their body temperature. During the winter they huddle together to keep warm or, if unsuccessful, die.

For example, Honeybees have to closely stick together to stay warm (and alive) in the winter. When temperatures in the winter drop below 50° F., honeybees retreat to their hives and form a winter cluster to keep warm. To maintain this warmth, honeybees huddle together and shiver. The shivering motion creates warmth in the hive as this constant motion keeps the inside temperature of the hive at the baseline needed for survival. The queen is always at the center of the cluster, and worker bees rotate from the outside to the inside of the cluster, so no individual worker bee gets too cold. The temperature of the cluster ranges from around 46 degrees Fahrenheit at the exterior to about 80 degrees Fahrenheit at the interior. The colder the weather is outside, the more compact the cluster becomes.

A honeybee does not die until its body temperature is about 41 degrees Fahrenheit. When temperatures are in low 40s the bee is unable to effectively operate or flex its shivering muscles to stay warm. The honeybee can survive cold temperature better than wind, as that is most harmful. Windchill is the single most harmful force that results in bee deaths in cold climates. Bees are cold blooded and there is a limit to the amount of heat they can generate by metabolizing honey and exercising their wing muscles. They can stay warm enough when active at outside temperatures in the low 40's, but the warmth will dissipate fairly quickly at colder temperatures and as activity decreases.

Although their wings do not move, the vibration created through shivering will raise their body temperature and help regulate the amount of heat present in the hive at any given time. The constant vibration and muscle movement performed by the bees takes its toll on them and drains them of energy.

In most cases, bees are ectothermic in nature—i.e. the temperature of the environment affects the temperature of the bee. Cold temperatures mean a cold bee and warm temperatures means a warm bee. In the cold, bees are generally not seen flying out and about. In fact, bees have difficulties flying when the temperature is below 55° Fahrenheit because their muscles lock up at these low temperatures.

Similar to bees, wasps will slow down almost completely as temperatures drop in the winter. Instead of scavenging, flying, and working incessantly like they do in the summer months, they'll preserve their energy. The cold temperatures will have a very noticeable effect on their daily activities and their metabolism will continue to drop. In fact, once temperatures drop below 50° F., wasps find it difficult to fly at all. If the temperature drops towards freezing and frost begins to appear, many of them will begin to die as winter approaches. Mobility diminishes as weather gets colder.

In summary, when cooled, pollinators slow down significantly and huddle together, but once they warm up they will become active and spread out again.

No known solution provides an approach and mechanism to safely remove the hives without a) killing or injuring the pollinators while preserving their ability to fly; b) avoiding any contamination of the hive, pollinators, or any remover of the hive with toxic chemical; c) agitating the pollinators to risk stings to the remover; d) avoiding contamination such that any honeycomb or other human consumable aspect remains safe for consumption; e) using any toxic chemicals; and f) risking fire or damage to paint or structures of any home, commercial building, or other hive location. What is needed, therefore, is a product and solution that overcomes the above-mentioned limitations and that includes the features enumerated above.

BRIEF SUMMARY

A mechanism is described to remove a beehive or other similar nests. If cold air is blown few inches away directly onto the hive at temperatures that are few degrees above the point at which the pollinator dies, that will substantially reduce the mobility of the pollinators. So, when a remover blows such controlled cold air close to the hive while standing at a safe distance, the insects have quite reduced mobility and are not able to move aggressively to attack the remover. In fact, when surrounded with cold air, they try to huddle together and will not swarm about. As the cold air is blowing, the remover uses attached sharp edges to cut down the hive. As the hive falls on the ground away from the blower where the temperature is warmer, the bees regain their muscle movement, and can soon resume their normal activities. However, by then the remover is gone and is not attacked.

Features and Advantages

The removal tool and mechanism detailed herein produces many benefits:
- Pollinators do not die and can continue to do their natural functions such as pollination and pest clearing.
- Unlike conventional approaches, pollinators are not doused with chemicals in order to kill them.
- As there are no chemical or other toxic substances used, there is zero damage to the environment in the immediate or broader surroundings as no chemicals will mix with air, water, or fall on the ground.
- The remover stays safe and is not stung.
- The remover's health is not impacted at all.
- Pollinators survival such as that of wasps and hornets allow them to continue doing their natural pest control functions, thus reducing the amount of pesticides needed.
- In case of beehives, the honeycomb is not contaminated and can be used for human consumption
- Any fire risk or other type of damage such as to the paint of structures is avoided.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Operation

Figure 1:
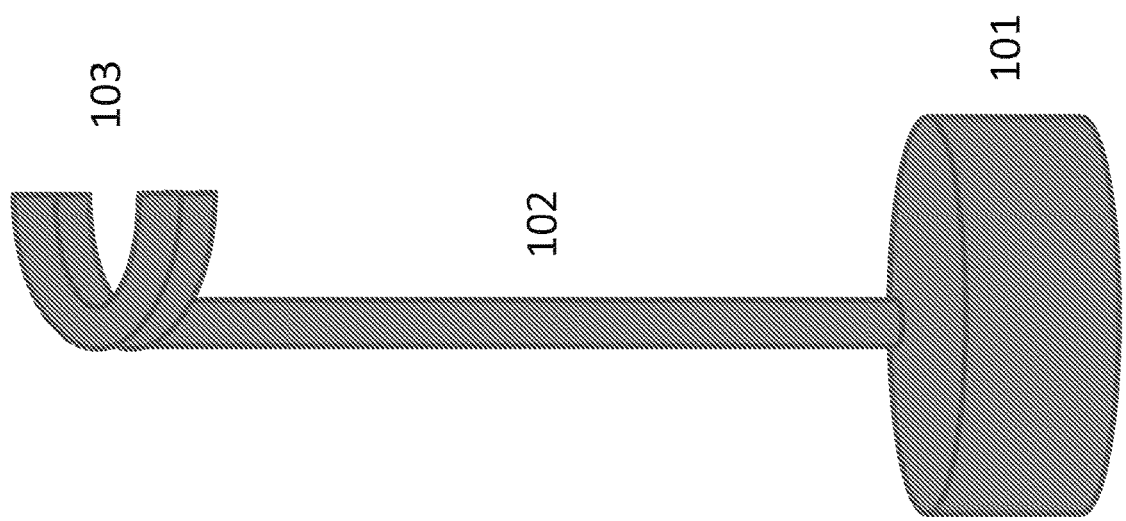
FIG. 1 is an illustration of a hive removal device.

Referring to FIG. 1, a device consists of three primary components. Base 101 includes a cooling mechanism. Pole 102 directs flow of cold air from base 101 to head 103, which is positioned close to a hive for removal.

Cooling base 101 sucks in outside air through a suction mechanism, lowers air temperature through a cooling mechanism, and pushes the cooled air with requisite pressure through the pole upwards.

Pole 102 may be a single piece straight pole or may comprise an assembly of multiple smaller segments brought together at the time of usage to create an extended pole.

Figure 2B:
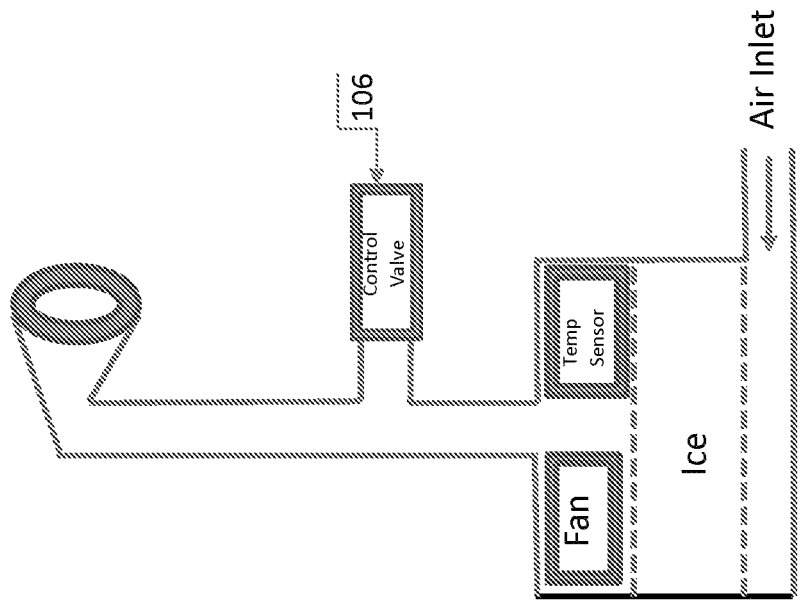
FIG. 2B is an illustration of the hive removal device of FIG. 2A with an additional control valve.
Figure 2A:
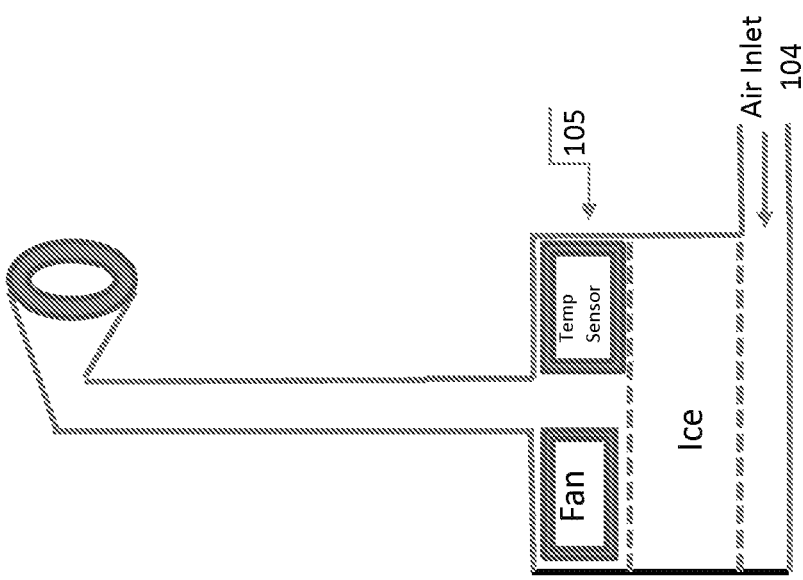
FIG. 2A is an illustration of the hive removal device of FIG. 1 with ice chamber cooling mechanism.

Head 103 connects to pole 102 and functions to a) blow cold air at the desired temperature with a sufficient opening to cover the nest; and b) have sharper edges on the end or a mechanism that enables knocking down the hive. There may be many variations in the head design Base 101 may have variety of mechanisms to cool the air. Referring also to FIG. 2A, in one embodiment the base may be a box that contains ice and has an inlet opening 104 to pull in air. A fan or pump may be used to force the air in. This air then travels upwards through the layers of ice and thus cools down in the process. Temperature sensor 105 measures the air temperature and displays it. The beehive remover may looks at a temperature display from the sensor and when the air is sufficiently cold at a desirable temperature use the tool to remove the nest. Referring also to FIG. 2B, in an alternate embodiment there may be a control valve 106 to prevent or allow the cooled air to flow through pole 102.

Figure 2D:
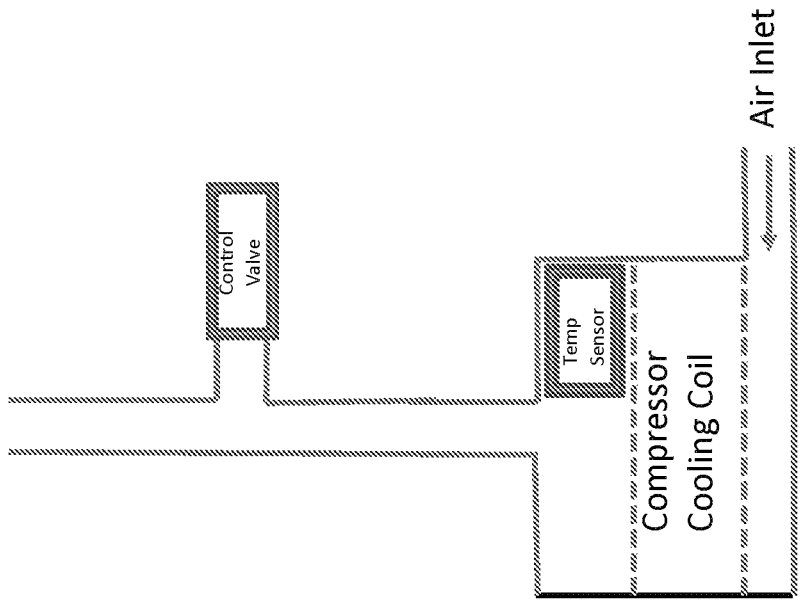
FIG. 2D is an illustration of the hive removal device of FIG. 2C with refrigerant in place of ice.
Figure 2C:
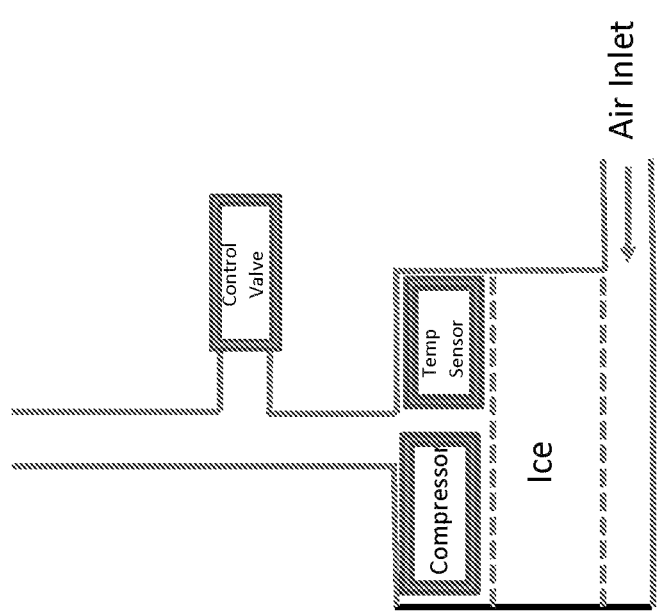
FIG. 2C is an illustration of the hive removal device of FIG. 2B with a compressor in place of a fan.

Referring also to FIG. 2C, in another alternative embodiment base 101 may have an air compressor instead of a fan or a pump. Referring also to FIG. 2D, in another alternative embodiment base 101 may use a refrigerant to cool the air. The use of a refrigerant is advantageous as it allows for tighter control of the temperature, faster cooling, and weighs less as ice is not needed, but may be more expensive.

Figure 2E:
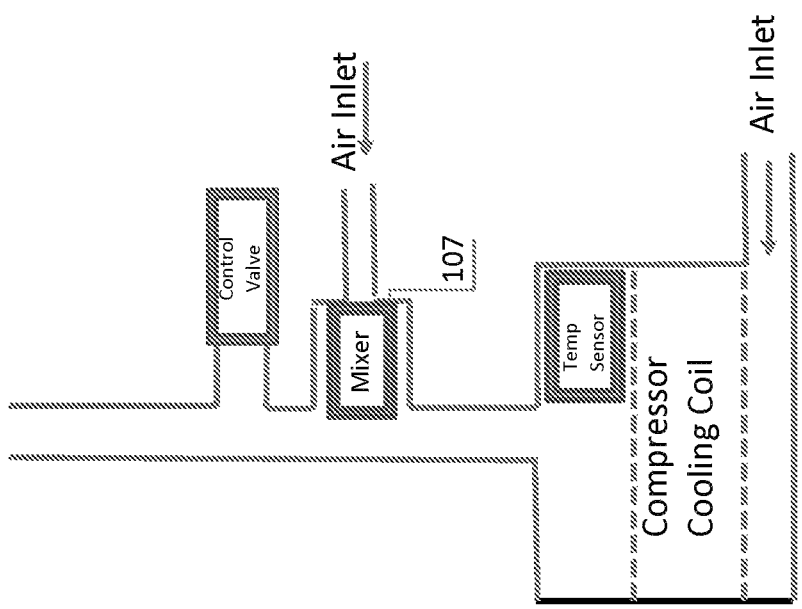
FIG. 2E is an illustration of the hive removal device of FIG. 2D with an additional mixer.

Referring also to FIG. 2E, base 101 may have mixer 107 allowing cooled air to be further modulated by the outside air. For example, a valve may be used to control the amount of external air being brought in for this modulating purpose. This may be particularly useful when the air temperature is observed as too cold for the pollinators, allowing the remover to easily adjust the valve of the mixer and instantaneously warm the cooled air to the desired temperature. This mixer may be combined with any of the cooling mechanisms used in the base.

Base 101 may be powered by either fuel such as diesel or gasoline, through batteries, or through electricity.

Figure 3B:
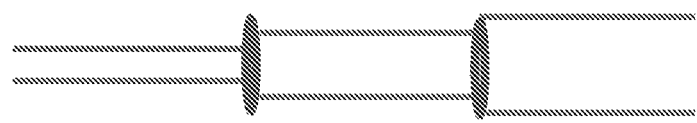
FIG. 3B is an illustration of an alternative multi-segmented pole for use in the hive removal device.
Figure 3A:
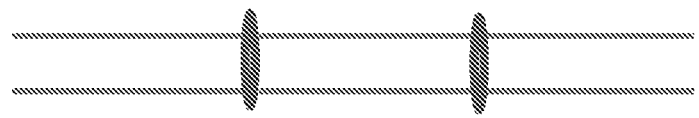
FIG. 3A is an illustration of a multi-segmented pole for use in the hive removal device.

Pole 102 is preferably a passive device acting as a conduit of air. It may be a single segment or have multiple segments put together in the field depending on the desired height/length. Referring also to FIGS. 3A and 3B, when segmented all segments may be of the same size with grooves at the ends as shown, or the segments may progressively have slightly reduced size allowing air pressure to further build up as air travels from base 101 to head 103 via pole 102.

Figure 4B:
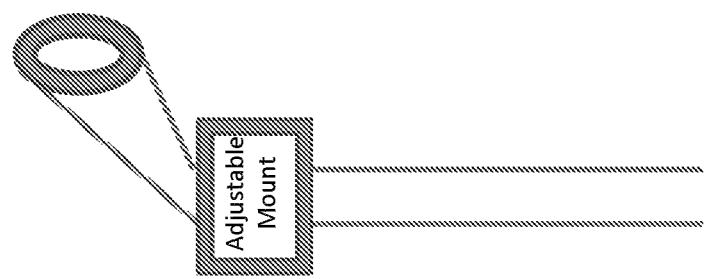
FIG. 4B is an illustration of a head connected by adjustable mount to the pole of the hive removal device.
Figure 4A:
FIG. 4A is an illustration of a screw-mounted head connected to the pole of the hive removal device.

Referring also to FIGS. 4A and 4B, head 103 may connect to pole 102 through one of several means. In a preferred embodiment, head 103 screws on top of pole 102. To enhance the movability/adjustability of the head, alternative embodiments may use one of many mechanisms such as a ball bearing or a hinge.

Figure 5B:
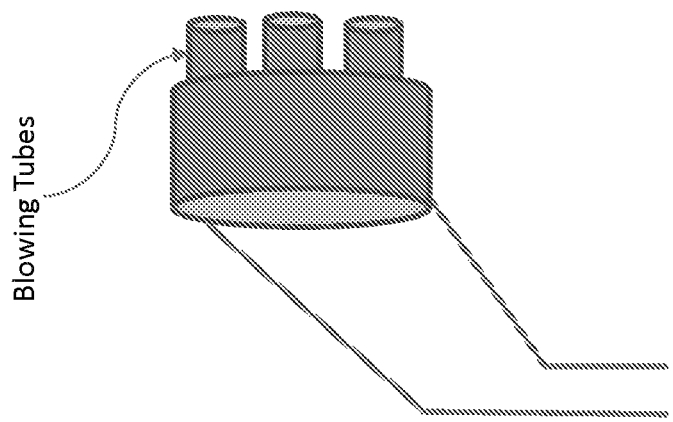
FIG. 5B is an illustration of a head with tube outlets of the hive removal device.
Figure 5A:
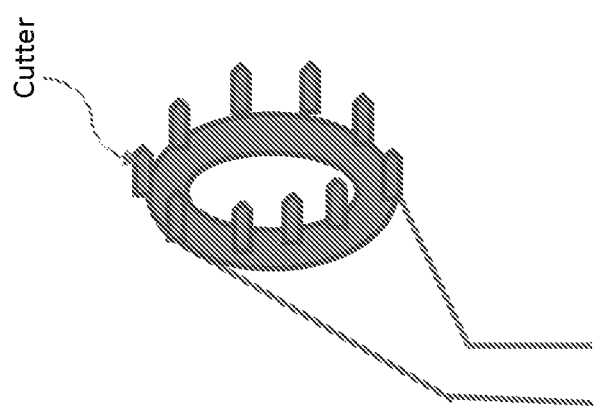
FIG. 5A is an illustration of a head with cutters of the hive removal device.

Head 103 may have many variations. Multiple heads or head-connected equipment may be provided with more than one plug-in option. In one embodiment, the head may have an opening around 4 to 6 inches in diameter, but may be smaller or larger depending on the use. Referring also to FIG. 5A, the structure of the head may also have sharper cutouts and sufficient strength to progressively dig into the hive and knock it off while blowing the air. Referring also to FIG. 5B, in an alternate embodiment head 103 instead of being fully open may have relatively smaller tubes to blow air at even higher pressure. In another alternative embodiment, the head size may be expandable like a small umbrella so that the remover may adjust it based on the hive size. The goal is for the blowing air to cover the whole hive so that all the pollinators are forced to further huddle into the cluster instead of coming out and attacking the remover.

Figure 6B:
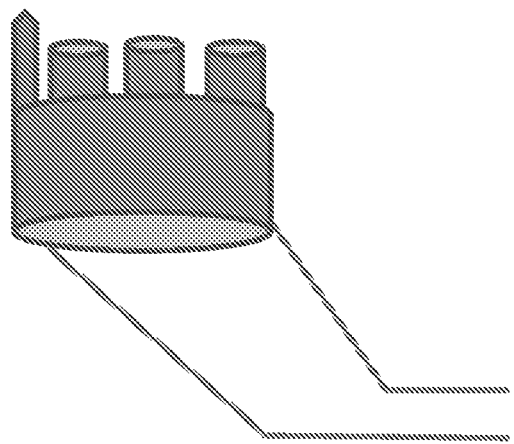
FIG. 6B is an illustration of a head with top cutters and tube outlets of the hive removal device.
Figure 6A:
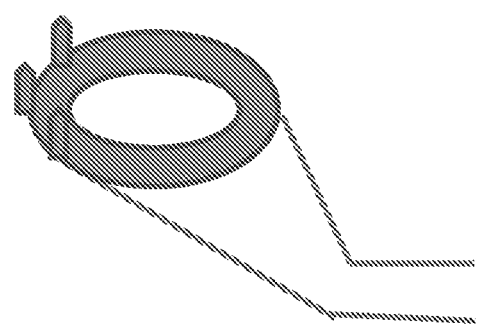
FIG. 6A is an illustration of a head with top cutters of the hive removal device.
Figure 7:
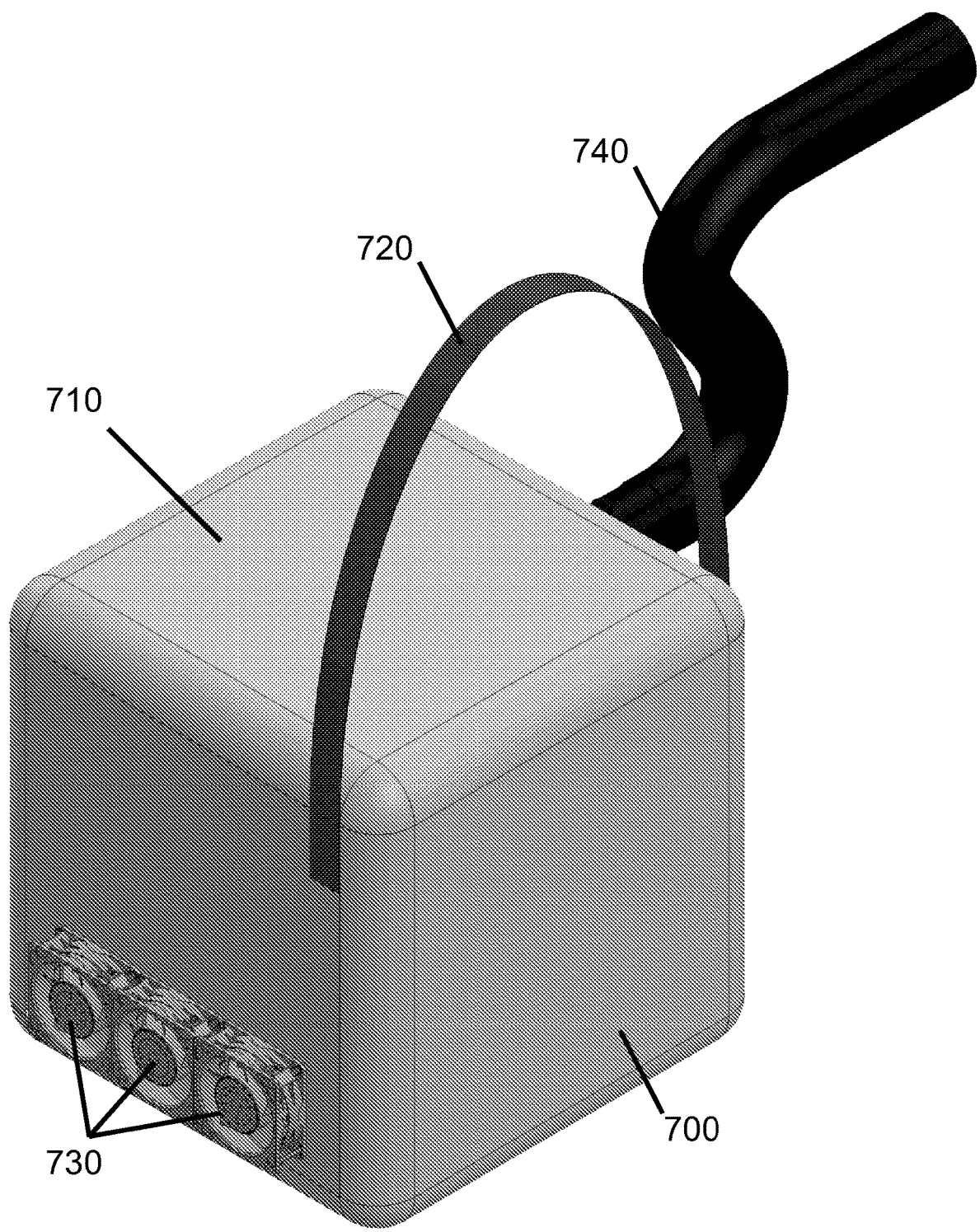
FIG. 7 is an illustration of a carriable embodiment of the hive removal device.
Figure 8:
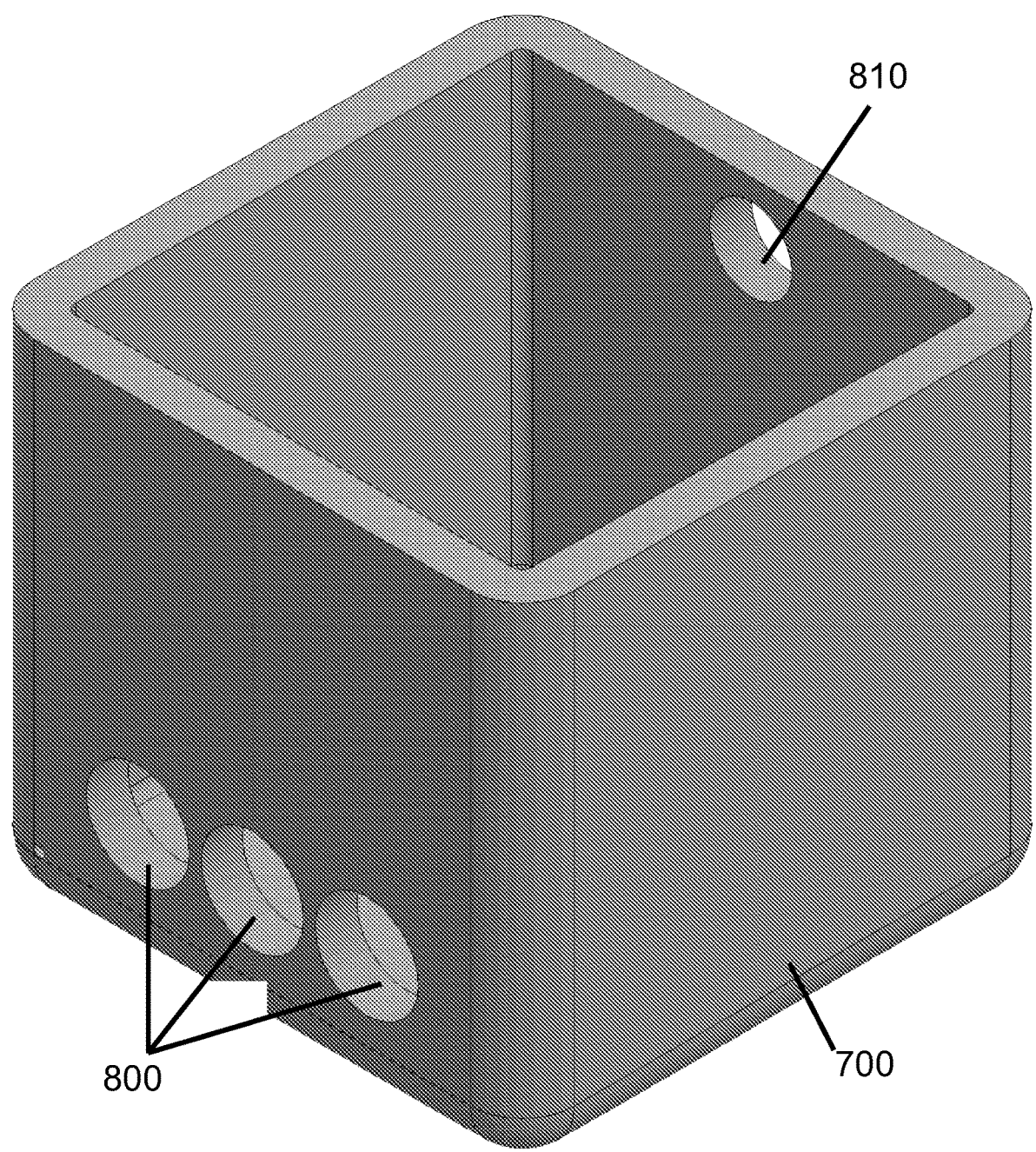
FIG. 8 is an illustration of the ice box of the device illustrated in FIG. 7.
Figure 9:
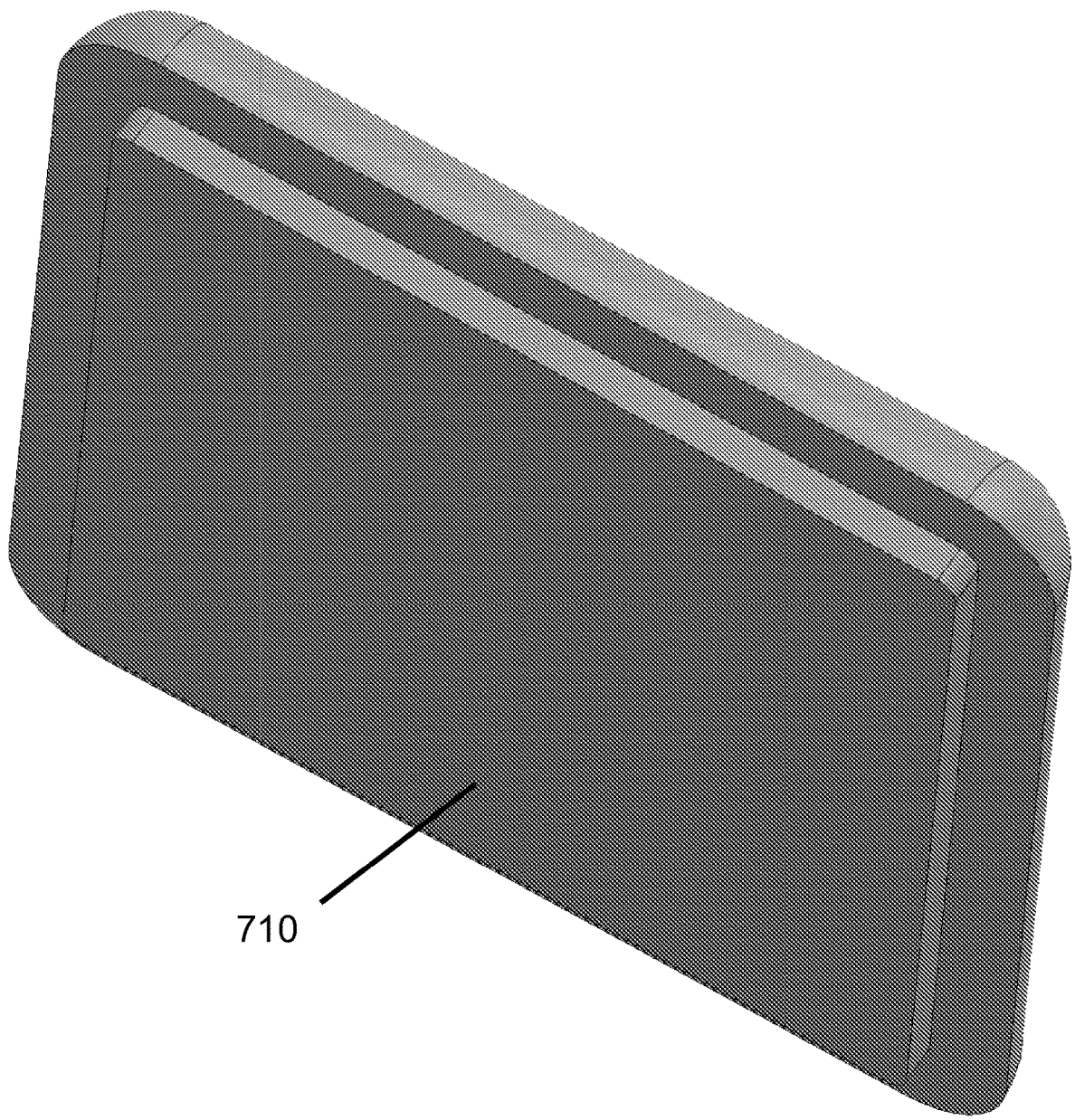
FIG. 9 is an illustration of a lid of the ice box of the device illustrated in FIG. 7.
Figure 10:
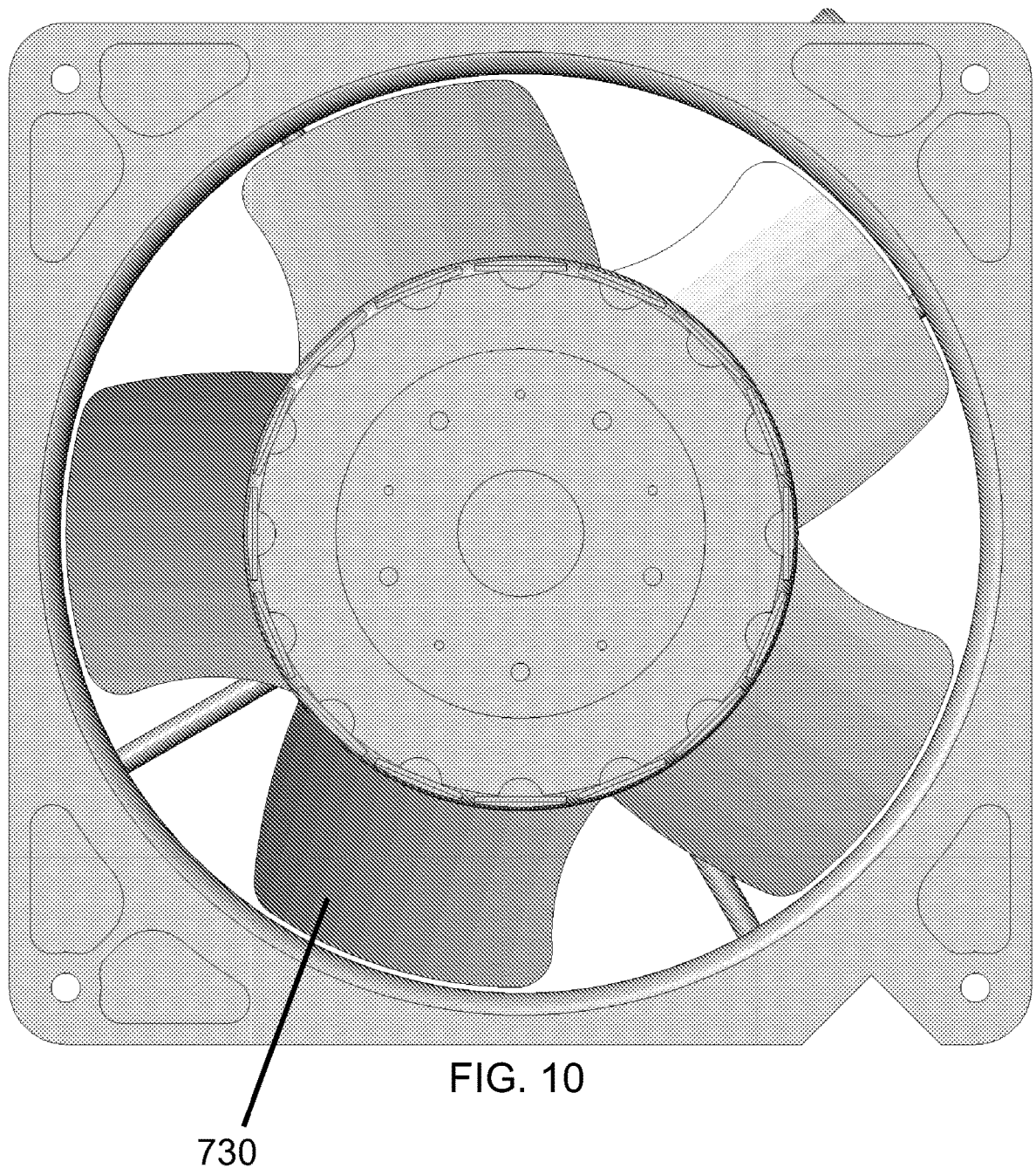
FIG. 10 is an illustration of a fan used with the device illustrated in FIG. 7.

Referring also to FIG. 6A, in another alternative embodiment only the top portion of head 103 has a few cutting points to dig into the hive to dislodge. Referring also to FIG. 6B, in another alternate embodiment, there my be a cutter part to the head that may extend a few inches longer than the blower (and/or the smaller blowing tubes) and sit on top of the blower opening. This may be used to detach the hive where it connects to a structure (the base of the hive). In another alternate embodiment, the cutter's height above the head may be adjustable to allow for cold air to blow on the whole hive while the cutter is used to detach the hive. There may be many such variations and/or combinations thereof.

After the hive has been blasted with cool air the pollinators are clustered together. At this time, either before or after the hive is struck down, an accompanying fine mesh net with drawstring closure may be used to cover the whole hive for transport. Once the hive is in the net, it can be transferred to a more ideal location without harming the remover. Additionally, the cold air can be used to continue keeping the pollinators in a cluster to further prevent any damage during the transportation process. Alternative to netting for immediate transport, once the hive is detached and at least partially falls, the remover quickly moves away from the location as the pollinators will recoup their muscle strength in few minutes when exposed to warm air again. Pollinators do not return to a fallen or broken hive. Once they regain strength and abandon the hive the remover can return and collect the honeycomb in the case of honeybees and/or discard the hive if not useful. Ultimately, the pollinators will unlikely create a hive in the exact same spot, to the removers' benefit, and will remain alive to support the agricultural ecosystem, also to humanities benefit.

Referring also to FIGS. 7, 8, 9, and 10, in one embodiment the base may be an openable icebox 700. The icebox may be filled with ice, and then closed with lid 710 to maintain an ice-chilled temperature within its interior. Carrying strap 720 may be attached to icebox 700 enabling manual carrying during operation. A plurality, such as three, of battery powered fans 730 may be attached to the icebox, each aligned with an intake hole 800. Operating the fans draws external air into the icebox, where it is cooled by the ice to a temperature causing bees and other pollinators to stop flying but not die (41° F.-55° F.). The fans further direct the ice-chilled air out of icebox 700 through the pole or exhaust hose 740. Exhaust hose 740 may attach to icebox 700 at exhaust hole 810, which may be in any side or lid 710, but is preferably in a side opposite intake holes 800. The head of hose 740 may be an opening to direct air to a hive targeted for removal, or any of the other head variations or equivalents to those described herein. During operation, hose 740 may be manually directed at a hive, and maintained until air temperature of the hive has dropped sufficiently such that bees or other pollinators are no longer flying but have not died. In practical use, on a 104° F. (40° C.) day, the icebox may be filled with five pounds of ice and is then sufficient to blow ~50° F. air at ten miles per hour for ten minutes on a hive, chilling the hive sufficiently. The low airflow is maintained to avoid adversely impacting bees through windchill. Typical (cooler) temperatures may require less ice, or more ice may be used for longer durations. A 4S LiPo battery (14.8V) provides sufficient power to operate the fans for about 80 minutes. Once sufficiently chilled, the hive may be detached from its present location through manual removal, use of any clipping tool, or through use of any hive removal head connected to the end of hose 740, and then relocated to another location. Cooling of the hive may be maintained throughout relocation to ensure safety from bees or other pollinators within the hive.

Other Embodiments

The remover tool and mechanism by type of equipment could also be used to shoo-off other cold-blooded animals. The equipment may also be used to kill truly destructive insects, such as killer hornets, by lowering the temperature if absolutely necessary.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:
1. A method of humane hive removal, comprising:
carrying a hive removal device having a carrying strap attached to an icebox base having five fixed sides and a lid;
filling the icebox base with ice;
closing the lid of the icebox base and maintaining an ice-chilled temperature within the icebox base;
operating a plurality of fans attached to the icebox base and aligned with intake holes, and:
  drawing external air across the plurality of fans, through the intake holes, and into the icebox base;
  ice cooling the drawn-in external air to a temperature between 41° F.-55° F.; and
  directing the ice cooled air out an exhaust hole and through an exhaust hose;
aligning the exhaust hose with a target hive;
chilling the target hive with air directed through the exhaust hose until bees or other pollinators within the target hive no longer fly but have not died;
detaching the target hive from a current location;
relocating the detached hive to a different location; and
ensuring safety from bees or other pollinators within the hive by maintaining chilling of the hive throughout relocation.

* * * * *